United States Patent [19]

Love et al.

[11] Patent Number: 5,075,875
[45] Date of Patent: Dec. 24, 1991

[54] PRINTER CONTROL SYSTEM

[75] Inventors: Richard I. Love, Oceanside, Calif.; Gerard L. Kappenman, Montrose, S. Dak.

[73] Assignee: AcuPrint, Inc., Carlsbad, Calif.

[21] Appl. No.: 512,645

[22] Filed: Apr. 20, 1990

[51] Int. Cl.⁵ ............................................. G06K 15/00
[52] U.S. Cl. ....................................... 395/117; 400/76
[58] Field of Search ................................ 364/518–520, 364/930 MS, 930.7 MS, 235 MS, 235.7 MS; 235/380; 400/76

[56] References Cited

U.S. PATENT DOCUMENTS 4,775,784 10/1988 Stark .................................... 235/350

Primary Examiner—Arthur G. Evans
Attorney, Agent, or Firm—Baker, Maxham, Jester & Meador

[57] ABSTRACT

A control system coupled with a laser printer to enhance and expand the capabilities of the printer. A microprocessor with memory components having different functions is coupled between a host computer and the raster image processor of the printer through appropriate interfaces. Bidirectional communication is afforded between the hose and the microprocessor, as well as between the printer and the microprocessor. The system has an audit trail feature which enables the printer to provide security when generating financial forms and negotiable instruments such as checks. The system also has means to facilitate external updating of its control code without changing any hardware on the board.

12 Claims, 2 Drawing Sheets

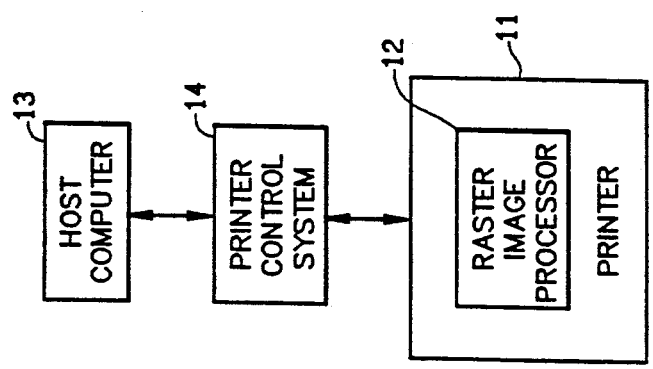
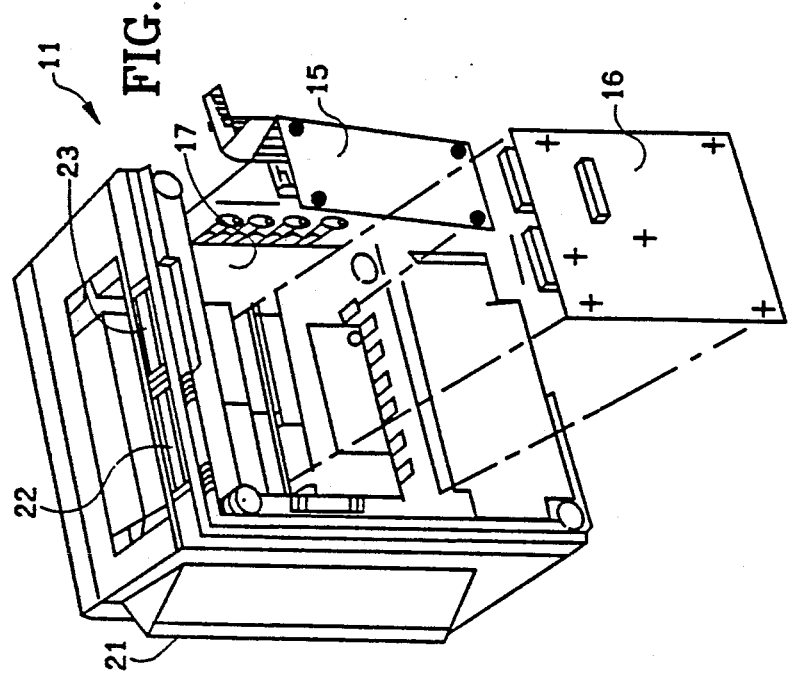
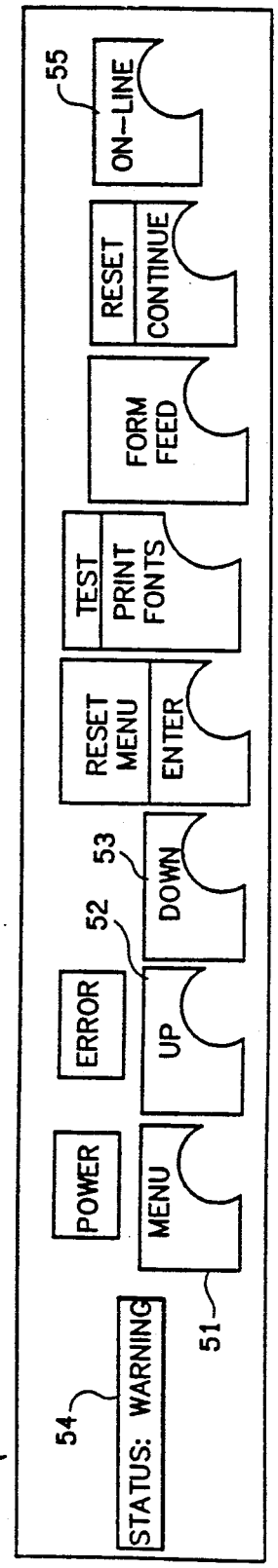

PRINTER CONTROL SYSTEM

FIELD OF THE INVENTION

This invention relates generally to printers and more particularly to a control system to enhance and expand the capabilities of a laser printer.

BACKGROUND OF THE INVENTION

The versatility of laser printers is well known. They can print forms, graphics and a rather limitless array of images. One important function is to print checks. Not just blank checks, but checks including payee, amount and the signature of a responsible party. When such financial documents are printed, there is an immediate need for security, including appropriate audit functions. Such printers are useful where many checks are written per day, such as in insurance companies, property management offices and financial institutions.

Check printers previously available have not had audit trail capability. Some highly complex and expensive printers have had a preprocessor, that is, have included microprocessor aspects with a printer. This added capability increased the versatility of the printer, without providing a high degree of internal security when involved in printing financial or negotiable documents.

When negotiable instruments such as checks are printed, they include magnetic ink character recognition (MICR) areas or lines. These lines of characters must be precisely formatted and printed to permit fast machine readability. It is also necessary that the MICR line be controlled so that nothing but MICR characters be printed in the area including the MICR line, called the "clear band."

SUMMARY OF THE INVENTION

Broadly speaking, the invention functions to add a significant level of intelligence to a laser printer so that the enhanced printer is enabled to perform security-protected check and general forms printing.

More specifically, the invention adds a computer to a laser printer. One major advancement afforded by this addition is the ability to internally generate and maintain an audit trail and to print out an audit report with appropriate security safeguards. The control system of this invention also provides for printer diagnostics. Further, it enables two-way communication with the host computer and facilitates upgrading of the control system by changing its internal functional code without physically disassembling and reassembling devices on the board, such as EPROM's.

The printer with the control system of this invention is intended to operate through a host computer in a multi-user environment, making security protection for the printed forms generation even more critical. It is a general forms printer with the added security to enable checks and other financial or negotiable documents to be safely printed. The control systems enables forms development tools to allow the user to build forms with audit fields and variable signatures and logos and download them to the printer raster image processor. The security mechanisms involved include check print auditing, password protection, a security key switch option and a security cartridge.

The control system can accept data from the host as fast as it can be delivered, much faster than the print engine can print. This data is stored in buffer memory until used. Accepting data from the host and outputting data to the print engine are completely asynchronous and parallel processes.

The parallel interface not only permits a high data transfer rate between the computer and the printer, it allows bidirectional communication, opening up the possibility of carrying on a dialogue with the host. Note that a parallel interface does not normally permit bidirectional communication.

BRIEF DESCRIPTION OF THE DRAWING

The objects, advantages and features of the invention will be more clearly perceived from the following detailed description, when read in conjunction with the accompanying drawing, in which:

FIG. 1 shows the general relationship between the host computer and the printer through the printer control system;

FIG. 2 is a partially exploded view of the bottom of a printer showing the location of the printer control system board of the invention;

FIG. 4 shows the control panel of the printer.

DESCRIPTION OF THE PREFERRED EMBODIMENTS

Figure 3:
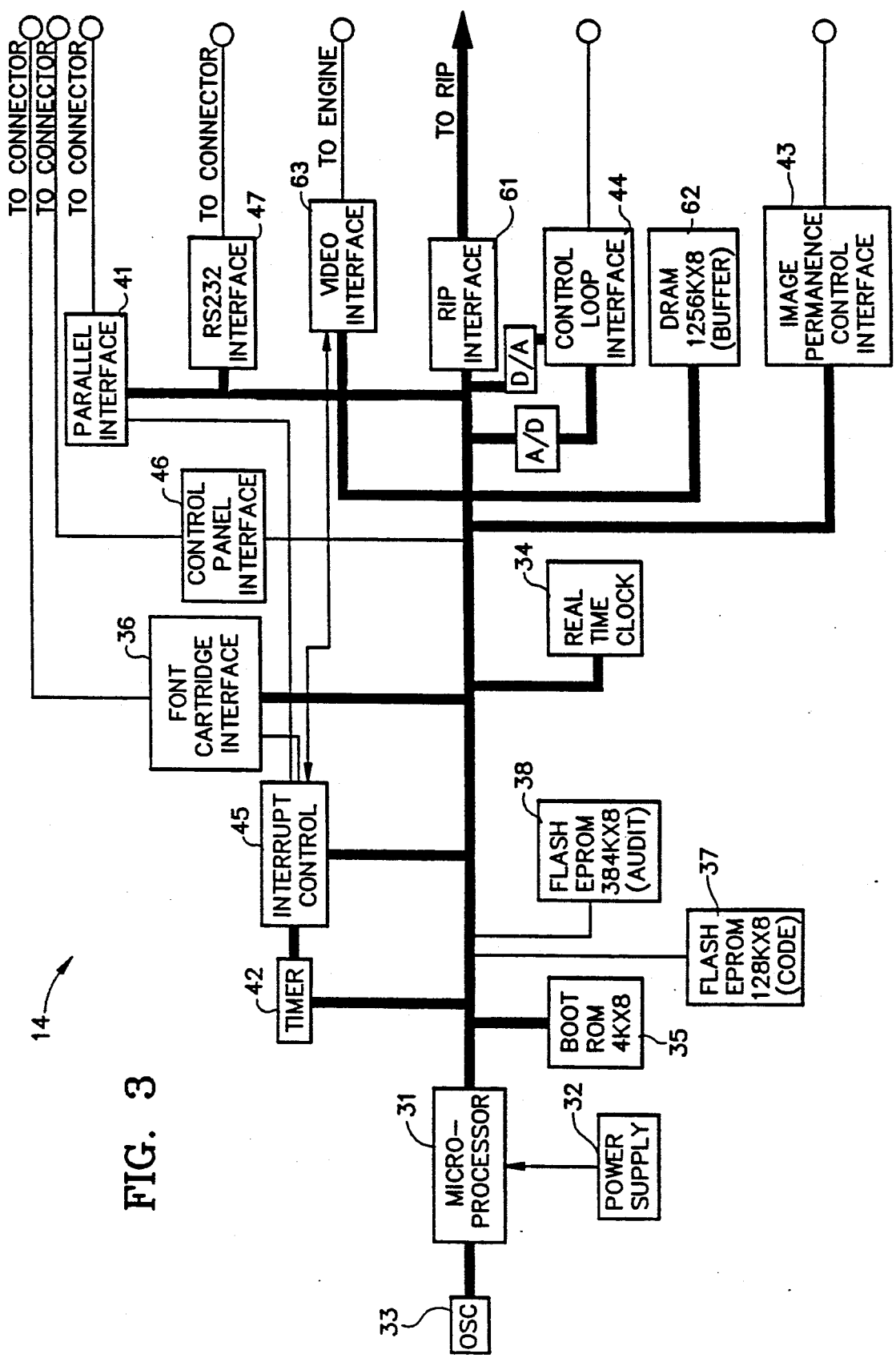
FIG. 3 is a block diagram of the printer control system of the invention.

With reference now to the drawing, and more particularly to FIG. 1, there is shown a standard laser printer 11 having its own raster image processor 12 embedded therein. Host computer 13 provides the detailed instructions, including the alpha numeric characters for completion of document printing, through printer control system 14. There will generally be an operator on the scene at the printer and an operator at the host computer, which may be located at any distance. The host computer can be coupled to the printer control system, which is mounted in the printer itself, by means of hard wiring if it is nearby or by appropriate interface connections and modems, if necessary. It is possible that the printer can be operated directly by the host computer without the need for an operator at the printer itself. The host computer has a two-way communication with the printer through the printer control system and, with its keyboard, provides the same functions as the printer control panel, as well as the data stream.

The printer is shown physically in FIG. 2 with the bottom panel removed showing a cavity which exists in a typical laser printer. The printer includes its own raster image processor which is controlled by the system of this invention. Separated out from the printer is engine video board 15 and printer control system board 16. Board 16 is in addition to the normal printer raster image processor board which would typically be mounted in such a printer. The engine video board is a part of the printer and appropriate interconnections and couplings are made in cavity 17 in the bottom of the printer. Control panel 21 is shown projecting outwardly from one side of the printer. Cartridge access doors 22 and 23 are shown on another side of printer 11. The function of these cartridge receptacles will be discussed in greater detail below. Except for board 16, printer 11 is a typical printer product as might be purchased from any printer manufacturer. An example of a particularly useful printer with which the invention may be employed to great advantage is made by Hewlett-Packard and is referred to by the trade name LASERJET Series II printer.

With reference now to the block diagram of FIG. 3, which represents the functional blocks of printer control system 14, the components of which are mounted on board 16, the main portion of the printer control system is microprocessor 31. This is the element, with its programming and inputs as shown in FIG. 3, which makes printer 11 an intelligent printer. The microprocessor is powered by power supply 32 and its timing is controlled by means of oscillator 33, both conventional elements. Real time clock 34 is not normally in a printer but is needed with this invention because the enhanced printer is used for printing financial documents. With the need for an audit trail, there is a need for time and date information to be included as part of that audit trail when such documents are printed.

Boot ROM 35 provides the basic bootable code to make the microprocessor run. When powered up, ROM 35 asks the basic question, "Are the systems up and running?" It then checks the cartridge slots, represented by font cartridge interface 36, to see if there is an updating or diagnostic cartridge in either of slots 22 or 23. If a cartridge is mounted in one of the slots and contains a code, ROM 35 will instruct the microprocessor to bypass all regular printer software and run directly off the cartridge. It will also determine if there is a diagnostics cartridge in one of the slots. If so, the diagnostics program will be executed instead of the normal printer software. ROM 35 tests the memories to see if they are functioning and determines generally if the control system and the printer are ready to do their jobs.

If there is a code update cartridge inserted in one of the cartridge slots, the information therein will be downloaded directly into flash EPROM 37. Note that to change how the printer operates normally requires the removal and replacement of EPROM's from the control board by means of typical technician tools, which may include screwdrivers and soldering irons. The code of the control portion of this printer may be updated simply by inserting a code cartridge in one of slots 22 and 23. The cartridge itself normally contains an EPROM as well as other circuitry. A particular advantage of this system is that a single cartridge may be employed to update each of a number of printers which are connected to a single host.

Alternatively, updating of the control system code may be accomplished through parallel interface 41 whereby data contained on a floppy disk in the host computer would be downloaded through that interface to flash EPROM 37.

After the basic system checks have been accomplished by ROM 35, the system comes under control of flash EPROM's 37 and 38. These are static RAM's which use flash technology to create a non-volatile random access memory (NVRAM). In actuality EPROM's 37 and 38 would normally be two portions of a single EPROM but they are shown separate here for expository purposes. The operating code in EPROM 37 is comprised of 128 K bytes of information. EPROM 38 provides storage comprised of 384 K bytes of information. The code element contains the actual printer control system operating instructions. This is the code which can be updated by means of a cartridge or by means of the floppy disk through interface 41 from the host. Storage EPROM 38 includes specifics as to type and format of forms, signatures, logos and audit functions.

In operation, the host, through interface 41, sends data to be printed. The audit function of EPROM 38 monitors that information and in effect, pulls out that which is to be stored in the audit trail memory. When the host desires a batch audit, that is, all audit records printed since the last request, the information is either supplied back through interface 41 or to the printer. When EPROM 38 is filled with audit records, it will indicate that information to the host. When the host interrogates for audit information, it can then erase at least a portion of the audit trail records. This may be all of the audit records on one chip, if there are multiple chips of this storage, and that would be the oldest information. Note that information stated above to be received from the host into the audit storage EPROM, those being objects such as forms, signatures and logos, could also be stored in a cartridge for printing check forms, including the names of payees and the amounts of the checks as well as check numbers and dates on the checks.

Timer 42 relates to the physical flow of printing media such as paper through the printer. This enables the microprocessor to know when to turn on certain specific aspects of the control system, such as the image permanence control through interface 43 and the control loop for printing of MICR characters through interface 44. In effect, timer 42 controls the timing of events on a page being printed. The image permanence control functions to enhance the permanence of the MICR characters and prevent smudging during high speed machine reading. This is apparatus added to the laser printer. The control loop controls the magnetic properties by controlling the magnetic signal levels when the MICR line is being printed.

Interrupt control 45 provides a signal to the microprocessor pursuant to inputs from the printer or other apparatus external to printer control system board 16. When the host is sending data to the control system, a signal from the interrupt control notifies the microprocessor. The same is true when a page is ready to commence printing or when a key on control panel 21 is actuated. This would provide a signal to interrupt control through control panel interface 46.

The means by which data is sent to and from control system 14 has been generally described as parallel interface 41. It is alternatively possible to provide bidirectional communication between the control system and the host through RS232 serial interface 47. Because serial communications are so slow, it is unlikely that they will be used but they may be desired in some instances. Two-way communication between the printer and the host is permitted by fast parallel interface 41. This is often referred to as a Centronics interface, made by Centronics Corporation. As this interface is adapted in this system, it allows the printer to talk back to the host and to permit these two systems to carry on a dialogue, although that is not normal for a parallel interface.

Control panel interface 46 enables control of the modes of the printer through control panel 21, shown in FIG. 4. The printer, through the control panel, is menu driven to select modes of operation such as size and orientation of paper, number of copies, font source, font number, form length, the cartridge being used and the many other things. From the main menu are available several other menus including a printing menu, a configuration menu, a report menu and an administrative menu. These are accessed through the main menu by initially depressing key 51 and then as desired, up or down keys 52, 53. The control panel includes an LCD one-line readout having 16 characters available for information. As each function arises to be performed or which is being performed by the printer, the status or identification of that function appears in LCD window 54. During selection in the menu system, the identification of the location of each line in each menu is shown. By using keys 52 and 53, the operator can step through the menu line-by-line. In order to disengage from the host and go off line to enable control panel 21 to be used, on line key 55 is depressed. To go back on line with the host, on line key 55 is depressed again.

RIP interface 61 is a hardware interface. Data from the host to be printed goes to the raster image processor in the printer. Each time the printer is powered up, the basic details of the forms to be printed must be sent to the RIP. Each time a form is changed or a new form is desired, the basic details of the form must be sent through interface 61 to the RIP. When the printer is in the process of printing those forms and on line information is needed, the host is connected through interface 61 to provide the on line stream of information. However, since the information can be provided through interface 41 much more rapidly than the printer can print, that downloaded information from the host is stored in buffer 62 which is a dynamic random access memory (DRAM). This allows much faster data transfer without waiting for the printer to do its job.

The control loop is another device added to the printer which controls the printing of MICR characters on the media being printed. The control loop is accessed through control loop interface 44 which includes a preamplifier and a sample and hold circuit. The sample and hold circuit samples only when the MICR line is being printed and provides information as to the magnetic density of the printed MICR characters to provide adjustments to the control loop as necessary to maintain machine readable quality of the MICR line. An analog to digital converter is included since the information from the control loop through interface 44 is in analog form. When information is passed from the microprocessor back to the control loop, a digital to analog converter is employed. The microprocessor provides complete control of the operation of the control loop and therefore turns on the sample and hold circuit when appropriate, and reads and responds as necessary to the MICR characters being printed to adjust the control loop as necessary.

Video interface 63 is connected between the microprocessor and the print engine. When the signal is given to start printing a page, an interrupt signal is provided to the microprocessor from interrupt control 45 and that starts the timing of the control loop and the image permanence control through respective interface 44 and 43. The video interfaces also passes error signals such as paper jams on to the microprocessor. The microprocessor tells about the error to the host through interface 41 and to the control panel through interface 46, where the error would be displayed. The video interface, under control of the microprocessor, prevents any data from being printed in the clear band where the MICR characters are printed. This is, in effect, a hardware lock.

Through image permanence control interface 43, microprocessor 31 turns control elements in the image permanence control system on and off to ensure that the MICR line of characters has enhanced permanence when being subjected to highspeed readers. This is an open loop control, with no feedback through interface 43.

In view of the above description, it is likely that modifications and improvements will occur to those skilled in the art which are within the scope of the accompanying claims:

What is claimed is:

1. A printer control system adapted to be connected between a remote host computer and a non-impact printer having a raster image processor, the printer having a control panel and at least one cartridge receiving slot, said control system comprising:
   a microprocessor;
   first interface means coupling said microprocessor to the host;
   second interface means coupling said microprocessor to the raster image processor;
   third interface means coupling said microprocessor to the control panel, thereby permitting selective parallel control of said printer through the host and the control panel;
   audit memory means for storing selected data and making an audit trail as documents are printed by the printer pursuant to instructions from the host computer; and
   means to retain audit trail information secure until authorized interrogation thereof from the host for display or printing of selected audit trail information.

2. The printer control system recited in claim 1, and further comprising a real time clock to mark audit records with day, date and time.

3. The printer control system recited in claim 1, and further comprising control loop interface means coupling said microprocessor to control loop means which controls magnetic signal levels when magnetic ink character recognition (MICR) characters are printed.

4. The printer control system recited in claim 1, and further comprising image permanence control interface means coupling said microprocessor to image permanence control means to treat the magnetic ink character recognition (MICR) characters to enhance their permanence and smudge resistance when subjected to high speed automated reading apparatus.

5. The printer control system recited in claim 1, and further comprising font cartridge interface means coupling said microprocessor to the cartridge receiving slot in the printer, cartridges in the cartridge receiving slot being adaptable to modify the functioning of the printer through the printer control system.

6. A method for adding control system functions to a laser printer having a raster image processor and a control panel, and enabling a remote host computer to control what is printed by the laser printer, said method comprising the steps of:
   coupling the host computer to the control system microprocessor through an interface;
   coupling the microprocessor to the printer raster image processor through an interface;
   coupling the microprocessor to the printer control panel through an interface, thereby permitting selective parallel control of said printer through the host and the control panel;
   providing form printing data to the control system from the host computer through the microprocessor;
   storing selected audit fields to create an audit trail when auditable forms are printed; and selectively externally obtaining audit trail information in a secure manner.

7. The method recited in claim 6, and comprising the further step of providing day, data nd time marking on the audit fields.

8. The method recited in claim 6, and comprising the further step of coupling the microprocessor to magnetic ink character recognition (MICR) control loop means through an interface, said MICR control loop means functioning to control the magnetic signal levels of MICR characters printed by the printer.

9. The method recited in claim 6, and comprising the further step of coupling the microprocessor to image permanence control means through an interface, the image permanence control means functioning to treat the magnetic ink character recognition (MICR) characters after they are printed by the printer to enhance their permanence and smudge resistance when subjected to high speed automated reading apparatus.

10. The method recited in claim 6, wherein the printer includes at least one cartridge receiving slot the method comprising the further step of coupling the microprocessor to the cartridge receiving slot in the printer, cartridges in the cartridge receiving slot being adapted to modify the functioning of the printer through the control system.

11. A printer control system adapted to be connected between a remote host computer and a non-impact printer having a raster image processor, the printer having a control panel and at least one cartridge receiving slot, said control system comprising:
  a microprocessor;
  first interface means coupling said microprocessor to the host;
  second interface means coupling said microprocessor to the raster image processor, said first and second interfaces comprising a parallel interface for high data transfer rate for bidirectional communication between the host and said printer;
  third interface means coupling said microprocessor to the control panel, thereby permitting selective parallel control of said printer through the host and the control panel;
  means for selecting data for audit storage from data transmitted from said host for printing by said printer;
  audit memory means for storing said selected data and making an audit trail as documents are printed by the printer pursuant to instructions from the host computer; and
  means to retain audit trail information secure until authorized interrogation thereof from the host for display or printing of selected audit trail information.

12. A method for adding control system functions to a laser printer having a raster image processor and a control panel, and enabling a remote host computer to control what is printed by the laser printer, said method comprising the steps of:
  coupling the host computer to the control system microprocessor through an interface;
  coupling the microprocessor to the printer raster image processor through an interface, this combination of coupling steps through interfaces of the host to the microprocessor and the microprocessor to the raster image processor enabling high data transfer rate bidirectional communication between the host and the printer;
  coupling the microprocessor to the printer control panel through an interface, thereby permitting selective parallel control of said printer through the host and the control panel;
  providing form printing data to the control system from the host computer through the microprocessor;
  selecting from data transmitted from the host to the control system certain data for audit storage;
  storing the selected audit fields to create an audit trail when auditable forms are printed; and
  selectively externally obtaining audit trail information in a secure manner.

* * * * *